(12) United States Patent
Pedrini

(10) Patent No.: US 6,273,311 B1
(45) Date of Patent: Aug. 14, 2001

(54) CARRIER FOR A MOTOR-VEHICLE ROOF

(76) Inventor: Fabio Pedrini, Via Zamboni, 1, Scala a Piano 1 Int. 3, 40125 Bologna (IT)

( * ) Notice: Subject to any disclaimer, the term of this patent is extended or adjusted under 35 U.S.C. 154(b) by 0 days.

(21) Appl. No.: 09/516,953

(22) Filed: Mar. 1, 2000

(30) Foreign Application Priority Data

Jul. 16, 1999 (EP) ................................................ 99830456

(51) Int. Cl.7 ...................................................... B60R 9/04
(52) U.S. Cl. ........................................... 224/321; 224/331
(58) Field of Search .................................. 224/309, 321, 224/322, 329, 331

(56) References Cited

U.S. PATENT DOCUMENTS

| | | | |
|---|---|---|---|
| 2,480,353 | * | 8/1949 | Bjork ................................ 224/329 X |
| 4,757,929 | * | 7/1988 | Nelson ................................ 224/329 |
| 4,809,943 | * | 3/1989 | Taschero ........................... 224/329 X |
| 5,226,570 | * | 7/1993 | Pedrini ............................. 224/321 X |
| 5,419,479 | * | 5/1995 | Evels et al. ........................... 224/321 |
| 5,730,343 |   | 3/1998 | Settelmayer . |
| 5,758,810 | * | 6/1998 | Stapleton ............................. 224/321 |
| 5,806,735 |   | 9/1998 | Christiansson et al. . |
| 5,931,359 | * | 8/1999 | Zona .................................... 224/321 |

FOREIGN PATENT DOCUMENTS

| | | | |
|---|---|---|---|
| 3626479 | * | 2/1988 | (DE) .................................... 224/321 |
| 0 623 490 |   | 11/1994 | (EP) . |
| WO 96 24509 |   | 8/1996 | (WO) . |
| WO 98 04436 |   | 2/1998 | (WO) . |

* cited by examiner

Primary Examiner—Gregory M. Vidovich
(74) Attorney, Agent, or Firm—Sughrue, Mion, Zinn, Macpeak & Seas, PLLC

(57) ABSTRACT

A carrier for a motor-vehicle roof comprises a bar provided at its ends with two supporting legs which constitute two outer clamping jaws which are for engaging two longitudinal guides secured to the motor-vehicle roof. An inner jaw is pivotally connected to each outer jaw and is moveable between an opened position and a closed clamping position. The bar is provided with a screw for actuating synchronous and symmetrical movements along the bar of two actuating members which are adapted to cause a movement of the two outer jaws towards each other at a first time, until the outer jaws engage the outer lateral surfaces of the two longitudinal guides, whereupon at a second time the two inner jaws are caused to close onto the longitudinal guides, so that clamping of the bar on the longitudinal guides is obtained.

7 Claims, 3 Drawing Sheets

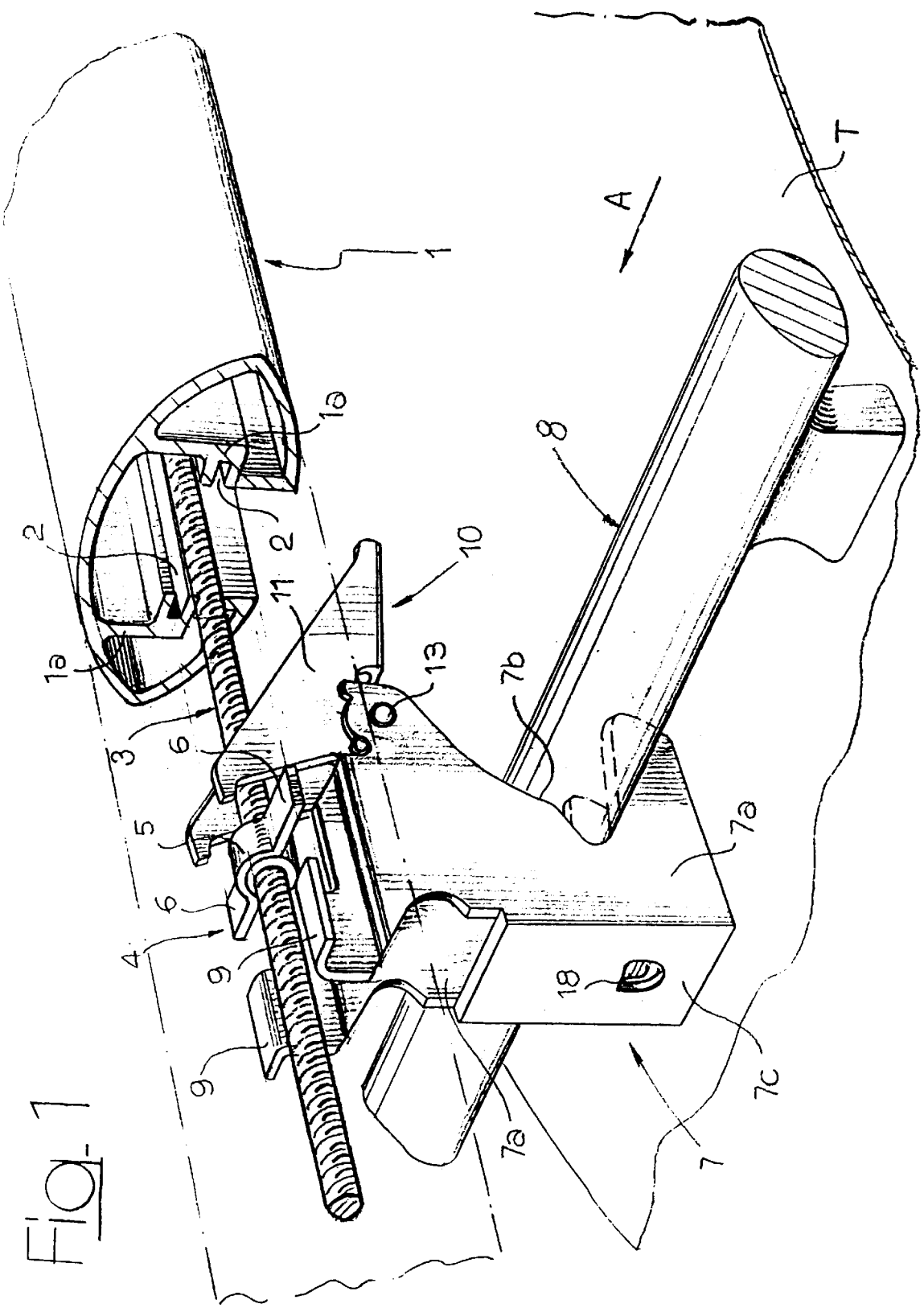

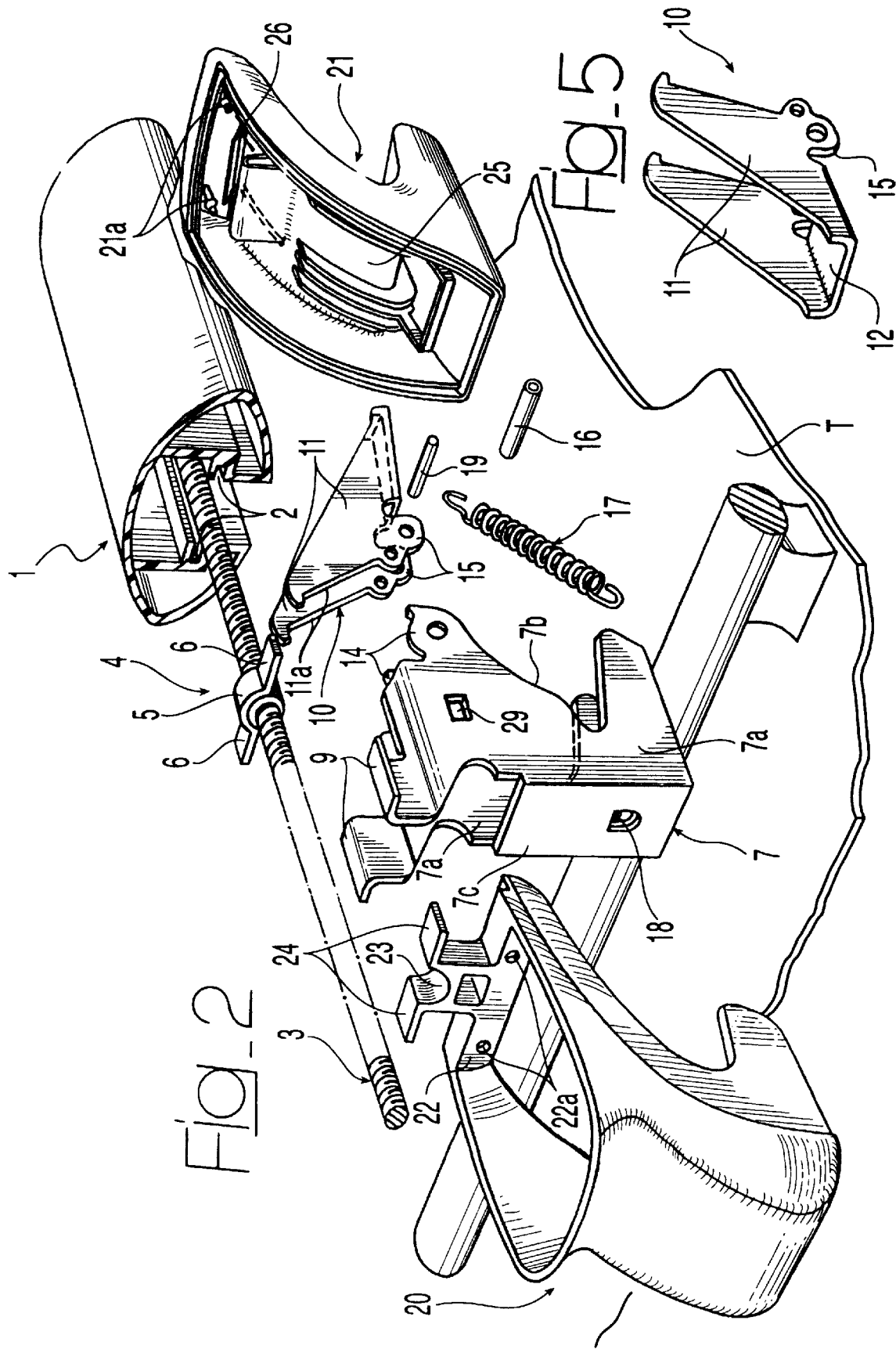

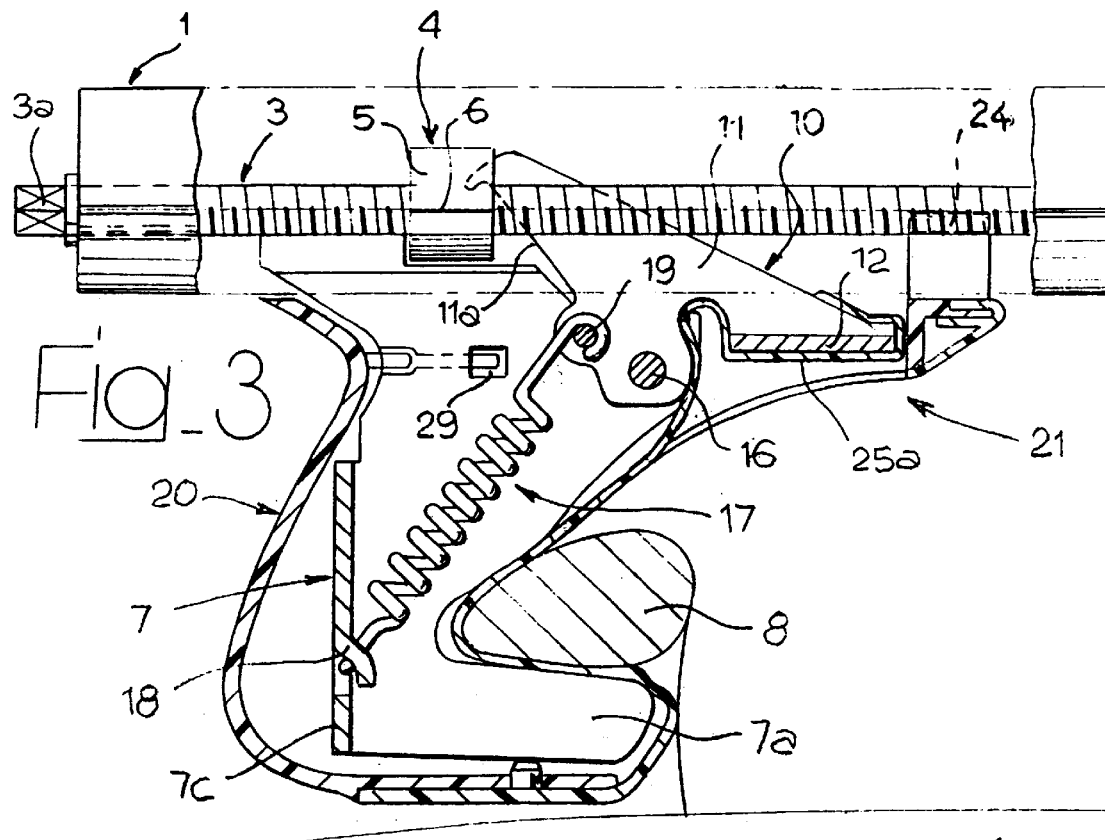
Fig_3
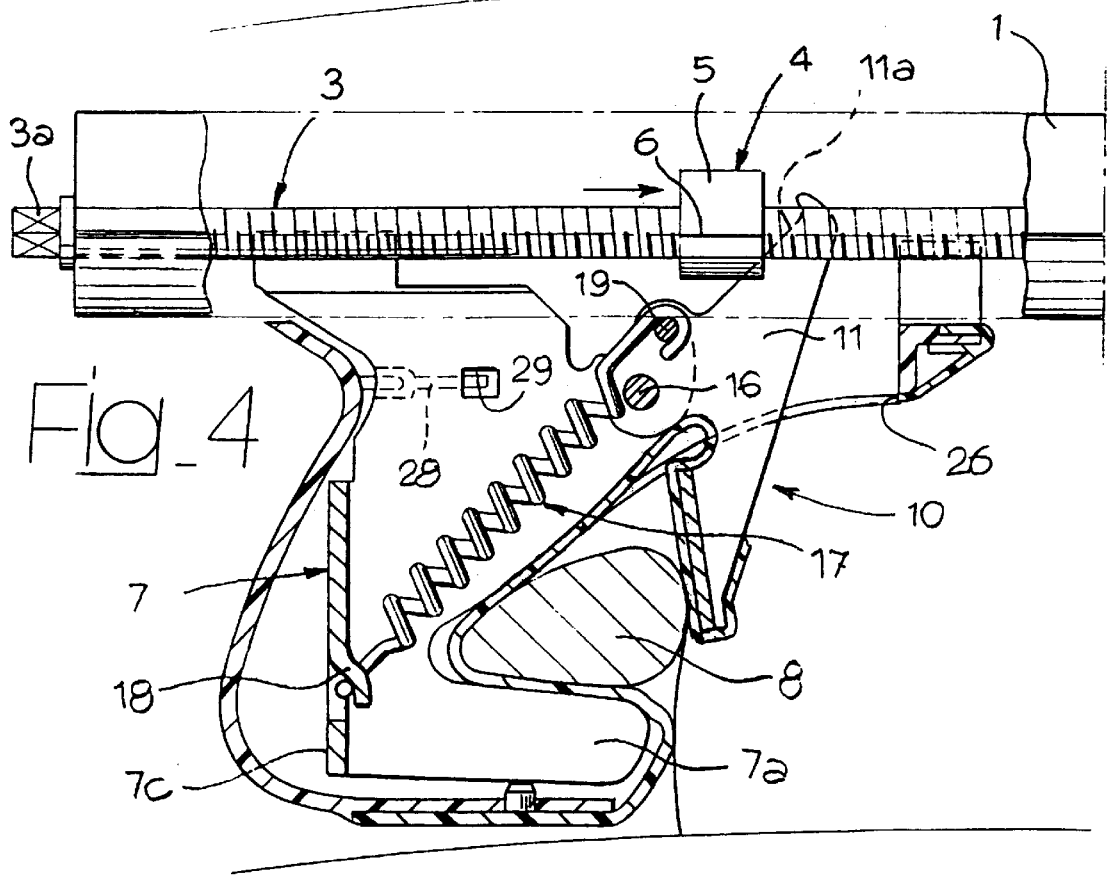
Fig_4

CARRIER FOR A MOTOR-VEHICLE ROOF

BACKGROUND OF THE INVENTION

The present invention is related to a carrier for a motor-vehicle roof, of the type comprising:

- a bar, having end portions and a longitudinal guide rail provided at least along each of said end portions,
- two bar supporting legs, which are to be supported on a roof of a motor-vehicle with the bar arranged transversally to the longitudinal direction of the motor-vehicle, each of said legs being slidably mounted within said guide rail,
- control means associated with said bar for controlling a movement of each of said legs along said guide rail,
- wherein said legs are to be mounted on two longitudinal guides secured to the motor-vehicle roof and are made in form of outer clamping jaws adapted to engage the outer lateral surfaces of said longitudinal guides, said carrier further comprising a pair of inner clamping jaws respectively cooperating with said outer jaws and adapted to engage the inner lateral surfaces of said longitudinal guides, so as to lock the bar on said longitudinal guides.

Carriers of the above indicated type are disclosed for example in U.S. Pat. No. 5,226,570 and U.S. Pat. No. 5,397,042 (FIGS. 7, 8) and in WO-A-96 25 306 (FIGS. 7–10).

SUMMARY OF THE INVENTION

The object of the present invention is that of providing a carrier of the above indicated type in which the operation for mounting the carrier on said longitudinal guides which are secured to the motor-vehicle roof, as well as the operation for removing the carrier from the roof, can be carried out rapidly and in an extremely easy manner by the user, the carrier also having a relatively simple and inexpensive structure, and being further able to adapt itself automatically to various shapes and dimensions of the cross section of the longitudinal guides.

In view of achieving this object, the invention provides a carrier having all the above indicated features and further characterized in that:

- each inner jaw is pivotally mounted to the respective outer jaw between an opened position and a clamping closed position,
- between each outer jaw and the respective inner jaw there are interposed spring means tending to hold the inner jaw in its opened position,
- said control means comprises an actuating member associated with each end portion of the bar, which is slidably mounted within said guide rail and is adapted to press against the respective outer jaw when it is moved towards the respective end of the bar, and against a portion of the respective inner jaw when it is moved towards the center of the bar.

In this manner, when the actuating member is moved towards the respective end of the bar, it trails therewith the respective outer jaw and hence also the inner jaw connected thereto, which is held opened by said spring means, whereas when said actuating member is moved towards the center of the bar it trails both said inner jaw and the associated outer jaw therewith, until the outer jaw comes in contact with the respect longitudinal guide secured to the motor-vehicle roof, whereupon the further movement of the actuating member towards the center of the bar takes place substantially without any further movement of the outer jaw and with a closing movement of the inner jaw.

Preferably, the above mentioned control means includes a screw-and-nut coupling.

According to a further preferred feature, the above mentioned screw-and-nut control means are adapted to simultaneously control two actuating members associated with the two end portions of the bar, so as to cause a synchronous and symmetrical movement of the two outer jaws acting as supporting legs for the bar. Typically, the above mentioned screw-and-nut control means are controlled by a control member located at one end of the bar and preferably provided with a security lock. Due to the above mentioned feature, the assembling and disassembling of the carrier according to the invention can be further simplified, since the user must simply arrange the bar transversally above the two longitudinal guides secured to the motor-vehicle roof, with the outer jaws arranged at the outside of the two longitudinal guides. Starting from this condition, the user shall simply use the control member located at one end of the bar to cause the simultaneous and symmetrical movement of the two outer jaws towards the longitudinal guides, until a contact is obtained between the two outer jaws and the outer lateral surfaces of the two longitudinal guides at a first time, and a clamping of the inner jaws over the longitudinal guides occurs at a second time.

BRIEF DESCRIPTION OF THE DRAWINGS

Further features and advantages of the invention will become apparent from the description which follows with reference to the annexed drawings, given purely by way of non limiting example, in which:

FIG. 1 is a perspective view, partially in cross-section, of an end portion of the carrier according to the invention, FIG. 2 is a perspective exploded view of a detail of FIG. 1, in which further components of the carrier are visible, FIGS. 3, 4 show a cross-sectional view of a supporting leg of the carrier according to the invention immediately before and after clamping on a longitudinal guide secured to a motor-vehicle roof, and FIG. 5 illustrates an inner clamping jaw which is associated with an outer clamping jaw.

DETAILED DESCRIPTION OF THE INVENTION

With reference to the drawings, the carrier according to the invention comprises a bar 1 for example constituted by a profiled element of light metal alloy, obtained by an extrusion process. The bar 1 has, in the illustrated example, a cross section having a substantially elliptical profile with pointed ends, and inner ribs 1a defining two longitudinal slots 2 which extend throughout the entire length of bar 1 and define a longitudinal guide rail extending throughout the whole length of bar 1. Similarly to what is known for example from U.S. Pat. No. 5,397,042 and U.S. Pat. No. 5,226, 570 through the inner cavity of bar 1 there is arranged a screw 3, which is rotatably supported at is ends by the same bar 1 and has one end 3a projecting from one end of bar 1 (see FIGS. 3, 4) and forming an engagement element for an operating member for driving rotation of the screw 3 and preferably protected by a security lock (not shown) similarly to what is known for example from EP-A-0 527 708.

In the preferred embodiment, a single screw 3 is provided, whose end portions have opposedly wound threads, so as to be able to cause a symmetrical and synchronous movement of the two supporting legs of the bar. However, it is also possible to provide two separated screws, respectively associated with the two end portions of bar 1 and each provided with a respective operating member.

Also, naturally, although the drawings show a single end of the bar constituting the carrier according to the invention, the end portion which is not illustrated is identical and symmetrical to that which is illustrated.

Reference numeral 4 designates an actuating member constituted by a nut 5 which is engaged by a screw 3 and includes two lateral horizontal wings 6 which are slidably mounted within the above mentioned longitudinal slots 2 forming the guide rail of bar 1. The rotation of screw 3 clockwise or counterclockwise causes a movement of the actuating member 5 towards the center of bar 1 (i.e. rightwardly with reference to the drawings) or towards the respective end of bar 1. Reference numeral 7 generally designates the frame of metal alloy of one of the two supporting legs of the bar 1 (the other leg being identical and symmetrical, as already indicated, to that which is illustrated). The leg 7 is provided in form of an outer jaw which is for engaging, as shown in FIGS. 1 and 3, 4, the outer lateral surfaces of a respective longitudinal guide 8 secured to the roof T of a motor-vehicle and extending parallel to the longitudinal direction of the motor-vehicle, designated by arrow A in FIG. 1. The carrier according to the invention is adapted to be mounted on a motor-vehicle roof of the type provided with two longitudinal guides as that indicated by 8 in the drawings. Typically, longitudinal guides of this type are provided on the roof of vehicles such as station-wagons, minivans or the like.

Reverting to the description of the structure of each leg 7, the metal frame of each leg comprises two parallel vertical walls 7a having a front profile 7b adapted to engage the outer lateral surface of the respective longitudinal guide 8, and a central wall 7c connecting the two vertical walls 7a to each other. These walls form two horizontal wings 9 at the top which are slidably mounted within the above mentioned longitudinal slots 2 of bar 1 and are located opposite to the lateral wings 6 of the actuating member 5, on the side facing towards the end of the bar. In this manner, the supporting leg 7 is subject to the pushing action of the actuating member 5 when the latter moves towards the respective bar end.

With the outer clamping jaw 7 there is associated an inner jaw constituted by an element of pressed metal alloy 10, comprising two parallel walls of sheet metal 11 connected to each other by a wall 12. The inner clamping jaw 10 is pivotally mounted around an axis 13 directed transversally to the axis of screw 3 to the walls 7a of the outer jaw. To this end, as clearly shown in FIG. 2, (the walls 7a,7b of the outer jaw 7 and the walls 11 of the inner jaw 10 have opposite ears 14, 15, respectively, with holes for engagement of an articulation pin 16.

A helical spring 17 is hooked at its ends respectively to an appendage 18 of wall 7c of the outer jaw 7 and to a pin 19 secured at its ends within respective holes of ears 15 of walls 11 of the inner jaw 10 (FIGS. 2–4). The spring 17 tends to hold the inner jaw in the opened position shown in FIG. 3. The inner jaw 10 has its upper portion shown in FIG. 4 defined by the upper portions of the two lateral walls 11, which is adapted to cooperate with wings 6 of the actuating member 5. More precisely, the wings 6 are adapted to come into engagement with edges 11a of walls 11 as a result of a movement of the actuating member 4 towards the center of the bar, i.e. away from the closest end of the bar. Naturally, as already indicated, the same structure is provided at the opposite end of the bar.

When the user must assemble the carrier on the motor-vehicle roof. The user puts the bar 1 above the two longitudinal guides 8 (only one of which is visible in the drawings) transversally to these guides, with the two outer jaws 7 (only one of which is visible in the drawings) at the outside of these guides. Starting from this condition, screw 3 is then caused to rotate, by engaging the end 3a (FIG. 3) with an operating member so as to cause a synchronous and symmetrical movement of the two actuating members 4 (only one of which is visible in drawings) towards the center of bar 1. The movement of each actuating member 4 towards the center of the bar causes corresponding movement of the inner jaw 10 along with the outer jaw 7 associated therewith, with the inner jaw 10 being held in the opened condition by spring 17. This is obtained because of the engagement of wings 6 of the actuating member 4 against the edges 11a of the inner jaw 11 which is thus compelled to move towards the center of the bar, trailing the outer jaw 7 theralong. During this stage, the inner jaw 11 remains in the opened position, since the force applied by the actuating member 4 to the inner jaw 11 is transmitted by the latter to the outer jaw 7 through the articulation pin 16, while jaw 7 is free to slide with its wings 9 within slots 2 of bar 1, the spring 17 having a sufficient force to ensure that in this stage the inner jaw 10 is kept opened. As result of this movement, the two outer jaws 7 (only one of which is visible in the drawings) will come into contact with the outer lateral surfaces of the two longitudinal guides 8. Starting from this condition, by continuing to rotate screw 3 in the same direction of rotation the two actuating members 4 will continue to move towards the center of the bar. However, this movement will not cause a further movement of the outer lateral jaws 7 with respect to the bar 1, so that only a rotation of each inner jaw 11 towards its closed clamping position will be obtained, against the action of the respective spring 17 (FIG. 4). Naturally, this movement will continue until the inner jaws will come in contact with the longitudinal guides 8, clamping them in cooperation with the outer jaws 7.

From the foregoing description, it is clearly apparent that the user is able to assemble the bar on the two longitudinal guides 8 in an extremely easy and rapid manner, by a single operation, consisting in imparting a continuous rotation to screw 3 so as to cause the movement of the two outer jaws 7 towards each other at a first time, until they engage the outer lateral surfaces of the longitudinal guides 8, and the rotation of the two inner jaws 10 to their clamping positions against the longitudinal guides 8 at a second time. It is further clearly apparent that the use of the device of the invention is not limited to a specific type and dimension of the longitudinal guide 8, since it is able to adapt itself to any form and dimension of the cross section of the longitudinal guides 8. For example, with reference to FIGS. 3, 4, the device would still operate well with a bar 8 having a section of lower or greater dimensions than those shown. This represents a further relevant advantage of the present invention, since storing and marketing of various types of carriers for various motor-vehicle models can be avoided.

Naturally, in order to avoid the metal-to-metal contact between the outer and inner jaws 7, 10 and the respective longitudinal guide 8, the jaws are provided with a cover of soft material. This cover is constituted by two half-shells 20, 21 of plastics or elastomeric material. With reference also to FIGS. 3, 4, the half-shell 20 comprises a wall covering the outer surfaces of the outer jaw 7 and an upper cross-member 22 from which an appendage 23 projects upwardly having two wings 24 which are slidably mounted within slots 2 of bar 1. The half-shell 21 has a wall 25 which covers the inner side of the outer jaw 7 and also covers the inner jaw 10, this element having an aperture 26 from which the inner jaw 17 projects when it is moved to its clamping condition (FIG. 4). A flexible portion 25a of the wall 25 covers the wall 12 of the inner jaw 10, to avoid the metal-to-metal contact between this jaw and the longitudinal guide 8. The half-shell 21 is provided with anchoring pins 21a which engage respective holes 22a of the cross member 22 of the other half-shell 20 (see FIG. 2), whereas the wall of the half-shell 20 is held against the outer surface of jaw 7 by tie-roads 28 which are hooked within slots 29 of walls 7a (FIGS. 3, 4).

From the foregoing description it is clearly apparent that carrier according to the invention can be mounted with extremely easy and rapid operations on the longitudinal guides 8 of the motor-vehicle roof. As already indicated above, to this end it is sufficient to drive a rotation of the screw 3 so as to cause a movement of the two outer jaws 7 towards each other, until their engagement against the longitudinal guides 8. At this point, by continuing to rotate the screw 3, the actuating members 4 will cause closing of the inner jaws 10 and clamping of the bar 1 on the two longitudinal guides 8.

If one wishes to remove the bar from the roof, it is sufficient to impart an opposite rotation to screw 3 so as to cause the movement of the two actuating members towards the end of: the bar. Starting from the condition shown in FIG. 4, this movement of each actuating member 4 towards the respective end of the bar (i.e. leftwardly with reference to FIG. 4) will firstly cause the opening of the inner jaw 10, because of the force applied by spring 17, until the condition 35 shown in FIG. 3 is reached. Subsequently, by continuing to rotate the screw, the wings 6 of the actuating member 4 will come into contact with wings 9 of the outer jaw 7, thus causing a movement of the outer jaw towards the respective end of the bar. The outer jaw 7 will be followed in its movement by the inner jaw 11, which will remain in an opened condition. Once the jaw 7 is totally disengaged from the respective longitudinal guide 8, the bar 1 can be raised and removed from the motor-vehicle roof.

Therefore, it is clearly apparent that both the mounting operation and the operation for removing the carrier according to the invention from the motor-vehicle roof can be carried out very simply and rapidly by the user. It is further evident that the carrier according to the invention is able to adapt itself to various forms and dimensions of the cross-section of the longitudinal guide 8 with no need of any particular additional operation. This represents a further advantage for the manufacturer, since it is not necessary to store and market an high number of different models of carriers for different models of motor-vehicles.

Finally, a further advantage of the invention, which is not of lower importance with respect to the advantages which have been mentioned already, lies in that the device according to the invention has a structure which is very simple and inexpensive.

Naturally, while the principle of the invention remains the same, the details of construction and the embodiments may widely vary with respect to what has been described and illustrated purely by way of example, without departing from the scope of the present invention.

For instance, clearly the means for controlling the movement of the two actuating members 4 may also be totally different with respect to what has been shown purely by way of example. Furthermore, although the preferred embodiment has control means able to cause a simultaneous and symmetrical movement of the two actuating members 4, it would also be possible to provide separate control means for the two actuating members 4, which can be activated at different times by the user.

What is claimed is:

1. Carrier for a motor-vehicle roof, comprising:

a bar having end portions and a longitudinal guide rail provided at least along each of said end portions, two bar supporting legs, which are to be supported on the motor-vehicle roof, with the bar arranged transversally to the longitudinal direction of the motor-vehicle, each of said legs being slidably mounted in said guide-rail of the bar, control means associated with said bar for controlling a movement of each of said supporting legs along said guide rail, wherein said legs are to be respectively mounted on two longitudinal guides secured to the motor-vehicle roof, and are made in form of two clamping outer jaws adapted to respectively engage the outer lateral surfaces of said longitudinal guides, said carrier further comprising a pair of clamping inner jaws, respectively cooperating with said outer jaws and adapted to respectively engage the inner lateral surfaces of said longitudinal guides, so as to clamp the bar on said longitudinal guides, wherein:

each inner jaw is pivotally mounted to the respective outer jaw between an opened position and a closed clamping position, between each outer jaw and the respective inner jaw there are interposed spring means which bias the inner jaw towards its opened position, said means for controlling movement of each outer jaw comprises an actuating member associated with each end portion of the bar, which is slidably mounted within said guide rail and is adapted to press against the respective outer jaw when it is moved towards the respective end of the bar, and against a portion of the respective inner jaw when it is moved towards the center of the bar.

2. Carrier according to claim 1, wherein said control means include a screw-and-nut coupling.

3. Carrier according to claim 2, wherein said coupling is adapted to simultaneously cause synchronous and symmetrical movements of the two actuating members associated with the two end portions of the bar.

4. Carrier according to claim 1, wherein each outer jaw comprises a structure of sheet metal provided with a cover of soft material, and including an upper portion which is slidably mounted within said guide rail, each inner jaw being also constituted by a sheet metal structure including at least one edge for engagement of said actuating member, said actuating member being interposed between said upper portion of the outer jaw and said engagement edge of the inner jaw.

5. Carrier according to claim 1, wherein each outer jaw has a structure of sheet metal including two lateral parallel walls connected by an intermediate wall and provided with two ears for pivotal connection of the respective inner jaw, which inner jaw comprises two parallel walls arranged inside the lateral walls of the outer jaw, said parallel walls of the inner jaw (10) having edges for engagement of two wings projecting for the actuating member, said spring means being constituted by a helical spring having its ends respectively hooked to said intermediate wall and a pin extending between the two parallel walls of the inner jaw.

6. Carrier according to claim 2, wherein said coupling comprises a screw rotatably mounted inside the bar and a nut constituting said actuating member, engaged by the screw and provided with two lateral wings slidably mounted in two opposite slots formed in the bar and constituting said guide rail.

7. Carrier according to claim 3, wherein said coupling comprises a screw rotatably mounted inside the bar and a nut constituting said actuating member, engaged by the screw and provided with two lateral wings slidably mounted in two opposite slots formed in the bar and constituting said guide rail.

* * * * *